July 3, 1962 W. WYTOVICH 3,042,111
MAGNETIC WINDSHIELD AND WINDOW COVERS
Filed Sept. 25, 1959 2 Sheets-Sheet 1
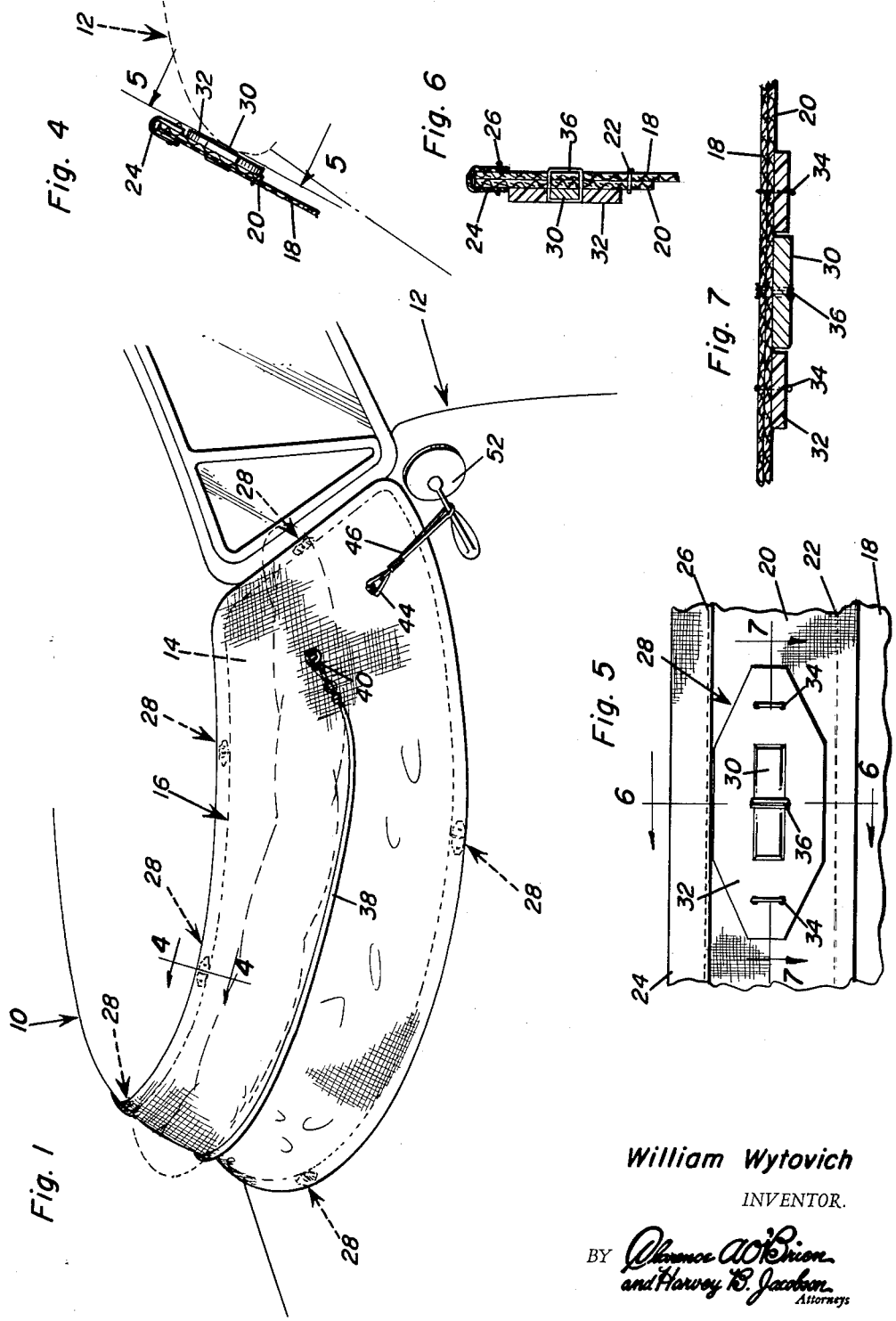
William Wytovich
INVENTOR.

July 3, 1962 W. WYTOVICH 3,042,111
MAGNETIC WINDSHIELD AND WINDOW COVERS
Filed Sept. 25, 1959 2 Sheets-Sheet 2
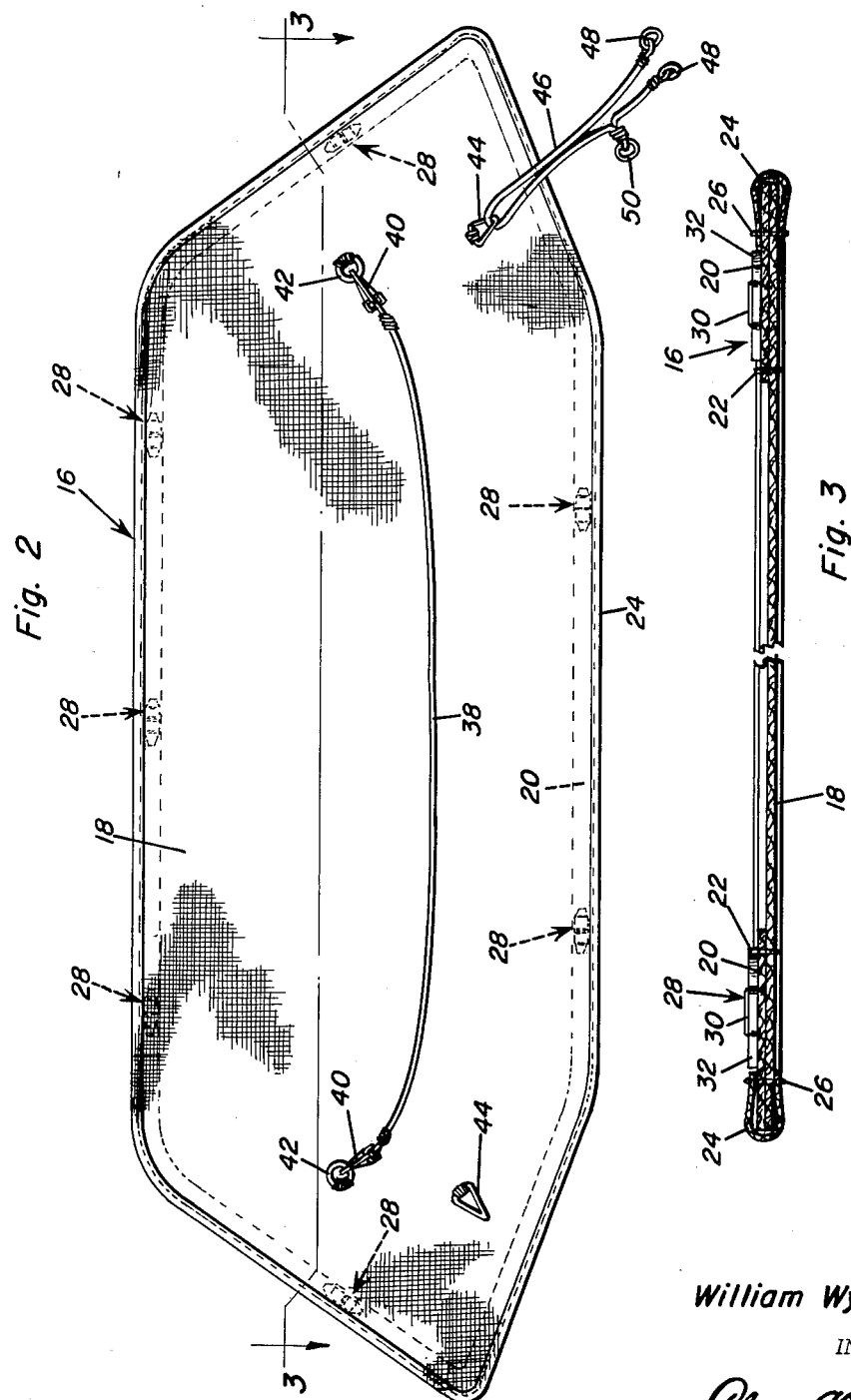
William Wytovich
INVENTOR.

United States Patent Office 3,042,111
Patented July 3, 1962

1

3,042,111
MAGNETIC WINDSHIELD AND WINDOW COVERS
William Wytovich, 645 Alvaro St., Reno, Nev.
Filed Sept. 25, 1959, Ser. No. 842,240
2 Claims. (Cl. 160—352)

This invention relates in general to new and useful improvements in accessories for vehicles, and more particularly relates to a cover for the windows of a vehicle, particularly the windshield thereof.

When a vehicle is left outside during the colder months, the operator of the vehicle often finds, much to his displeasure, that the windshield and other windows thereof are coated with frost or ice which, of course, has to be removed before the vehicle can be safely operated. At the present time this condition is combated either by permitting the frost or ice to accumulate and attempting to scrape it off with inefficient hand scrapers, or by placing newspapers or other makeshift types of coverings over the windows of the vehicle.

Numerous attempts have been made in the past to devise suitable coverings for the windows of vehicles but without commercial success. The main problem and not solved by the prior coverings is the quick and effective securement of the covering in place and the ease and removal thereof. The average motorist, particularly when pressed for time in the morning, desires a covering which may be quickly removed and stored, otherwise, the purpose of the cover is, for the most part, defeated.

It is therefore the primary object of this invention to provide a cover for the windows of a vehicle, including the windshield of the vehicle, which cover is of extremely simple construction and which may be readily placed on the vehicle and removed therefrom.

Another object of the invention is to provide an effective cover for the windows of the vehicle, the cover being so constructed that once it is positioned on the vehicle, it will remain in place notwithstanding the fact that the vehicle is subject to the usual winter winds.

Still another object of the invention is to provide a novel cover for the windows of a vehicle, the cover being provided with an unloader cord which extends between opposite end portions thereof, the unloader cord being of a nature that it is merely necessary to pull on the unloader cord to pull the window cover progressively away from the vehicle at opposite ends of the cover.

A further object of the invention is to provide a novel cover for the windows of the vehicle, including the windshield thereof, the cover being in the form of a sheet of water repellant material which is of a size to completely cover the desired window and the portion of the vehicle body defining the window opening, and a sheet being provided with a plurality of magnets spaced about the peripheral edge thereof for engaging the body of the vehicle, the magnets being in the form of bar magnets which are inset in protective non-magnetic holders.

Still another object of the invention is to provide a novel cover for vehicle windows particularly the windshield thereof, the cover being in the form of a sheet of water repellent material having a plurality of magnets disposed in spaced relation about the peripheral edge thereof for holding the cover in place, and there being additionally provided holding means in the form of a line which may be attached to the side view mirror of a vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the forward portion of a vehicle which shows the windshield thereof covered by a cover in accordance with the invention;

FIGURE 2 is a plan view of the windshield cover of FIGURE 1 shown laid out flat and removed from the windshield;

FIGURE 3 is an enlarged fragmentary sectional view taken substantially upon the plane indicated by the section line 3—3 of FIGURE 2 and shows the specific details of construction of the cover, an intermediate portion of the cover being omitted;

FIGURE 4 is an enlarged fragmentary vertical sectional view taken substantially upon the plane indicated by the section line 4—4 of FIGURE 1 and shows the relationship between the window cover and the portion of the body of the vehicle defining the upper part of the windshield;

FIGURE 5 is an enlarged rear plan view of the cover and shows the details of the mounting of a magnet thereon;

FIGURE 6 is an enlarged fragmentary vertical sectional view taken substantially upon the plane indicated by the section line 6—6 of FIGURE 5 and shows further the details of the mounting of the magnet; and FIGURE 7 is an enlarged fragmentary horizontal sectional view taken substantially upon the plane indicated by the section line 7—7 of FIGURE 5 and shows still further the details of the mounting of the magnet.

Referring now to the drawings in detail, it will be seen that there is illustrated in FIGURE 1 a portion of a vehicle, generally referred to by the numeral 10. The vehicle 10 includes a body, generally referred to by the numeral 12 which is provided with a windshield, the windshield being referred to by the numeral 14. In accordance with the invention, the windshield 14 is provided with a cover, which is referred to in general by the reference numeral 16.

The cover 16, as is best illustrated in FIGURE 2, is formed of a relatively large sheet of water repellent material 18. The sheet 18 will be of a size and shape so as to completely overlie the windshield 14 and that portion of the vehicle body 12 bordering the windshield 14. As is best shown in FIGURE 3, the peripheral edge of the sheet 18 is folded upon itself as at 20 so as to form a reinforced peripheral edge. The folded edge portion of the sheet 18 is secured in place by suitable stitching 22. Also, a suitable tape 24 is placed over the extreme peripheral edge of the cover 16 and is secured in place by stitching 26. It is to be noted that the folded over peripheral edge portion is folded over in the direction toward the windshield.

In order that the cover 16 may be retained in place overlying the windshield 14, the cover 16 includes a plurality of magnet units, each of which is generally referred to by the numeral 28. Each magnet unit 28 includes a bar magnet 30 and a holder 32. The holder 32 is formed of a non-magnetic material and is preferably formed of a material which will not scar the vehicle body 12 when the cover 16 is being applied. The holder 32 may, for example, be formed of a material such as fiber board and the like. As is best illustrated in FIGURES 5 and 6, each of the holders 32 is elongated and is provided with tapered ends. Each holder 32 is secured to the sheet 18 by suitable stitching 34 passing through the end portions thereof. Stitching 34, if desired, may be in the form of staples. It is also to be noted that the holder 32 is of a lesser thickness than the bar magnet 30 with the result that the bar magnet 30 projects rearwardly through the holder 32. The bar magnet 30 is also secured in place on the sheet 18 by a suitable stitching 36.

When it is desired to place the cover 16 in position on the vehicle body 12 overlying the windshield 14, it is merely necessary to place the cover 16 in its approximate position around the windshield and then to individually position the magnets in engagement with the vehicle body 12.

In order to facilitate the removal of the cover 16, an inelastic unloader cord 38 is provided. The unloader cord 38 is provided with eyes 40 at each end thereof which are passed through eyelets 42 suitably secured to the front or outer surface of the sheet 18. The eyes 40, if desired, may be in the form of removable snap fasteners, or they may be integral portions of the unloader cord 38. When it is desired to remove the cover 16, one merely grips the central portion of the unloader cord 38 and pulls forwardly thereon. As a result, the opposite ends of the sheet 18 are progressively peeled from the windshield area and the entire cover 16 will move into the arms of the person removing the cover.

The lower corner portions of the sheet 18 are also provided with additional eyelets 44 which are suitably secured to the forward surface of the sheet 18. The eyelets 44 are illustrated as being generally triangular in outline as opposed to the circular outlines of the eyelets 42. Each of the eyelets 44 may be provided with a suitable hold-down cable 46 which is formed of a flexible cord material and which is provided with eyes 48 at the ends thereof and a third eye 50 adjacent one end. The central portion of the hold-down cable 46 is passed through its respective eyelet 44.

The purpose of the hold-down cable 46 is to aid in the holding of the cover 16 in overlying relation to the windshield 14. Many vehicles are provided with side view mirror units 52, as is best illustrated in FIGURE 1. The hold-down cable 46 may be suitably secured to the supporting arm for the side view mirror in the manner illustrated in FIGURE 1.

From the foregoing, it will be readily apparent that there has been devised a very simple, yet highly effective means of anchoring a cover for a vehicle window. Further, there has been provided novel means for facilitating the removal of a large cover from a vehicle, such as a cover for the windshield thereof. Although only a cover for the windshield of the vehicle has been illustrated and described hereinabove, it is to be understood that similar covers may be provided for all of the other windows of the vehicle, including the rear window.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cover for vehicle windshields comprising a flexible sheet of water repellent material having reinforced peripheral edge portions, a plurality of spaced non-magnetic patches stitched to said marginal edge portion and providing bar magnet holders, each patch having a central slotted portion providing a pocket, a bar magnet arranged in said pocket and independently stitched to the marginal edge portion of the cover, the cross-sectional thickness of the magnet being greater than the cross-sectional thickness of the patch to facilitate attachment of the magnet to a magnetizable surface, an elongated inelastic cord provided at opposite free ends with snap fasteners, said cover being provided on a median outwardly facing surface portion adjacent but inwardly of the transverse ends and longitudinal marginal edges with attaching eyes, said snap fasteners being secured to said eyes and causing said cord to extend lengthwise across said outwardly facing surface, and separate loop-shaped hold-down cords secured to the opposite corner portions of said cover, the points of attachment of the hold-down cords being adjacent to the longitudinal marginal edge of the cover and just inwardly of the respective transverse marginal edges.

2. A cover for vehicle windshields comprising a flexible sheet of water repellent material having reinforced peripheral edge portions, a plurality of spaced non-magnetic patches stitched to said marginal edge portion and providing bar magnet holders, each patch having a central slotted portion providing a pocket, a bar magnet arranged in said pocket and independently stitched to the marginal edge portion of the cover, the cross-sectional thickness of the magnet being greater than the cross-sectional thickness of the patch to facilitate attachment of the magnet to a magnetizable surface, an elongated inelastic cord of a length slightly less than the length of said cover and provided with snap fasteners, said cover being provided at free attachable ends on a median portion adjacent but inwardly of the transverse ends with attaching eyes and said snap fasteners being secured to said eyes, and hold-down cords secured to the opposite corner portions of said cover, said hold-down cords being secured in place by way of eyelets provided therefor on said corner portions, said cords being adjustably and detachably held in place and each cord having complemental end portions equipped with a plurality of selectively usable eyes.

References Cited in the file of this patent

UNITED STATES PATENTS

| | | |
|---|---|---|
| 2,223,145 | Wise | Nov. 26, 1940 |
| 2,341,236 | Parkins | Feb. 8, 1944 |
| 2,389,298 | Ellis | Nov. 20, 1945 |
| 2,639,751 | Flaherty | May 26, 1953 |